United States Patent
Berger et al.

(10) Patent No.: US 6,494,485 B2
(45) Date of Patent: Dec. 17, 2002

(54) GAS BAG

(75) Inventors: Juergen Berger, Mutlangen (DE); Wolfgang Hieber, Heubach-Buch (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/875,513

(22) Filed: Jun. 6, 2001

(65) Prior Publication Data

US 2001/0050475 A1 Dec. 13, 2001

(30) Foreign Application Priority Data

Jun. 13, 2000 (DE) .......................... 200 10 507

(51) Int. Cl.$^7$ ............................... B60R 21/20
(52) U.S. Cl. ............................... 280/743.1
(58) Field of Search ............... 280/743.1, 730.2

(56) References Cited

U.S. PATENT DOCUMENTS

| | | | | |
|---|---|---|---|---|
| 5,265,903 A | * | 11/1993 | Kuretake et al. | 280/730.2 |
| 5,540,459 A | * | 7/1996 | Daniel | 280/730.2 |
| 5,785,350 A | * | 7/1998 | Inoue et al. | 280/730.2 |
| 5,810,388 A | | 9/1998 | Beradi et al. | |
| 5,868,420 A | * | 2/1999 | Higashiura et al. | 280/730.2 |
| 5,884,937 A | * | 3/1999 | Yamada | 280/730.2 |
| 5,906,395 A | * | 5/1999 | Isaji et al. | 280/728.2 |
| 5,921,575 A | * | 7/1999 | Kretschmer et al. | 280/728.2 |
| 6,010,149 A | * | 1/2000 | Riedel et al. | 280/729 |
| 6,106,007 A | * | 8/2000 | Kretschmer et al. | 280/730.2 |
| 6,135,490 A | * | 10/2000 | Spary | 280/730.2 |
| 6,171,228 B1 | | 1/2001 | Marotzke et al. | |
| 6,203,058 B1 | * | 3/2001 | Elqadah et al. | 280/729 |
| 6,224,091 B1 | * | 5/2001 | Eyrainer et al. | 280/730.2 |
| 6,224,092 B1 | * | 5/2001 | Sakamoto et al. | 280/730.2 |
| 6,227,561 B1 | * | 5/2001 | Jost et al. | 280/730.2 |
| 6,238,438 B1 | * | 5/2001 | Fischer et al. | 280/728.2 |

FOREIGN PATENT DOCUMENTS

| | | |
|---|---|---|
| DE | 3544704 | 10/1987 |
| DE | 29516426 U1 | 1/1996 |
| DE | 19535565 A1 | 3/1997 |
| EP | 0734913 | 2/1996 |
| GB | 2314302 | 12/1997 |
| JP | 02303952 | 12/1990 |
| JP | 10218484 | 8/1998 |

* cited by examiner

Primary Examiner—Paul N. Dickson
Assistant Examiner—Deann Draper
(74) Attorney, Agent, or Firm—Tarolli, Sundheim, Covell, Tummino & Szabo L.L.P.

(57) ABSTRACT

In a folded gas bag for a vehicle occupant restraint system the folded gas bag comprises two superimposed walls of the gas bag laid in folds and the folded gas bag is delimited by imaginary first and second fold edge regions. The fold edges of the folds extend in a straight line and parallel to one another. The folds have fold heights measured from one of the fold edge regions and at least two differing fold heights are provided.

4 Claims, 2 Drawing Sheets

GAS BAG

FIELD OF THE INVENTION

The invention relates to a folded gas bag for a vehicle occupant restraint system.

BACKGROUND OF THE INVENTION

Gas bags which in an accident have in their inflated state the function of protecting a vehicle occupant from injuries can be arranged folded, usually in a housing, at various points of the vehicle prior to their activation, i.e. their inflation. Above all side gas bags which when inflated cover parts of the side panes of the vehicle to protect the head of the vehicle occupant are often folded up with folds parallel to one another to be accommodated in an elongated housing. Because of the very limited space available the folded gas bag package should be as small as possible.

Following its activation, the gas bag must unfold reliably and rapidly, for which the folding of the gas bag is not least decisive. Up to the present, gas bags are known which are laid in uniform successive folds having equal height, the resulting gas bag package being accommodated in a housing.

BRIEF SUMMARY OF THE INVENTION

It is the object of the present invention to propose a gas bag with a folding reducing the space required by the gas bag package and being able to influence the unfolding of the gas bag.

To this end, in a folded gas bag for a vehicle occupant restraint system the folded gas bag comprises two superimposed walls of the gas bag laid in folds and the folded gas bag is delimited by imaginary first and second fold edge regions. The fold edges of the folds extend in a straight line and parallel to one another. The folds have fold heights measured from one of the fold edge regions and at least two differing fold heights are provided. Hereinafter, a fold is understood to mean a fold edge with the two gas bag sections bordering thereon. In this connection, the distance of a fold edge from a fold edge region of the folded gas bag is referred to as the height of the fold, in contrast to the stack thickness of a fold which in a folded gas bag is defined as the distance between two fold edges on the same fold edge region of the gas bag. The fold edge regions of the folded gas bag are determined by the outer fold edges each. The distance between the fold edge regions can be defined by the maximum distance between two fold edges facing opposing fold edge regions. In the gas bag according to the invention the folds do not necessarily extend from one fold edge region to the other fold edge region of the gas bag package but can also adopt any height which is less than the distance between the two fold edge regions. The advantages of this folding are represented by the possibility of reducing the packing volume of the folded gas bag, also called a gas bag package, and of influencing the exit behavior of the gas bag by a corresponding distribution of the fold heights.

Preferably, the folds lie in planes extending parallel to each other and being vertically stacked. All of the folds of the folded gas bag have preferably fold edges extending parallel to one another.

The fold edge regions are defined by at least some of the fold edges of the gas bag on each side of the folded gas bag. For reasons of clearness here the fold edge regions are taken to be parallel to one another.

In a first preferred embodiment of the invention, the sequence of the height of the folds is chosen such that the fold edges of two successive folds are not directly superimposed. Since in this way two fold edges successive on the same fold edge region are staggered, the volume of the gas bag package is reduced, since because of their radius of curve the fold edges in a gas bag package are bulkier, i.e. they require more space than the gas bag sections therebetween.

It is also possible that on one fold edge region all fold edges of the folded gas bag, which face this fold edge region, are superimposed.

In a further preferred embodiment the sequence of the heights of the folds is chosen such that the center of gravity of the folded gas bag lies adjacent to an imaginary center line of the folded gas bag to influence an exit direction of the gas bag when the gas bag is inflated. In this connection, the sequence of the heights of the folds can be chosen such that e.g. only few fold edges occur on one fold edge region of the folded gas bag whereas many occur on the other fold edge region whereby in the folded state the mass of the gas bag is arranged asymmetrically relative to an imaginary center line which extends in the middle between the two fold edge regions. Since in this way the center of gravity of the gas bag package is placed out of the center line, the exit direction of the gas bag, when inflated, can be different from the center line.

The height of the successive folds preferably corresponds to a repeated sequence of fold heights, wherein at least two of the fold heights are different, to simplify the folding of the gas bag. A preferred sequence consists in the sequence of a deep fold following a flat fold, and another preferred sequence consists in the sequence of several folds becoming continuously flatter. In particular in a combination with the above-mentioned features a wide range of the position of the center of gravity of the gas bag package or, in more general terms, of the shape of the gas bag package can thus be obtained with the least possible packing volume.

Another advantageous application consists in arranging the gas bag within a gas bag module having gas outlet openings and arranging the folds near the gas outlet openings such that they cover the gas outlet openings at least partially. This permits to influence the filling of the gas bag above all in the top region.

The invention is above all suited for side gas bags but can also be used advantageously for front passenger gas bags or any other gas bag which is folded with straight parallel folds.

DETAILED DESCRIPTION OF PREFERRED EMBODIMENTS

Figure 4:
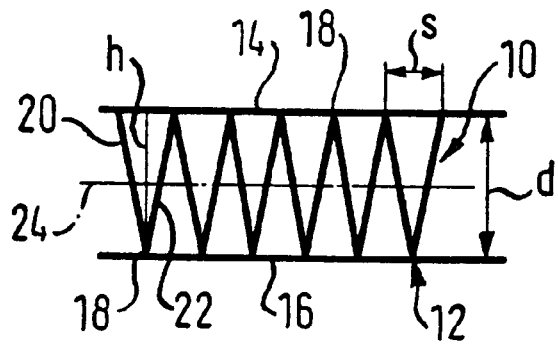
FIG. 4 shows a section through a gas bag, which is folded according to the prior art.

FIG. 4 shows a known folded gas bag 10 which is laid in successive folds 12 having equal height. One fold 12 consists of a fold edge 18 and the two gas bag sections extending from this fold edge, marked as 20 and 22 in FIG. 4. Tthe fold height h corresponds to the distance d between two (imaginary) lateral fold edge regions 14, 16, defined by the distance of the fold edges 18. The distance d may correspond to the distance between two housing walls. In the embodiments shown here, the fold edge regions 14, 16 are parallel to each other.

The folds shown herein are only represented by one line for reasons of illustration. However, in reality they consist of two superimposed gas bag walls as evident from FIG. 5. Also for reasons of illustration, the folds are shown in a drawn-apart view, whereas in the gas bag package they are, of course, arranged with the least possible space.

The distance between two fold edges 18 on the same fold edge region is defined as the stack thickness s below.

Figure 1:
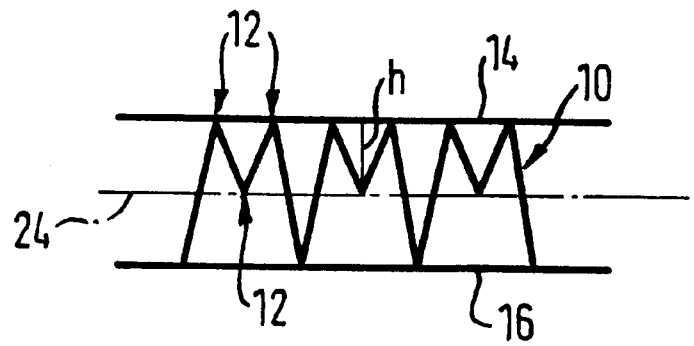
FIG. 1 shows a section through a gas bag according to the invention, which is folded according to a first kind.
Figure 2:
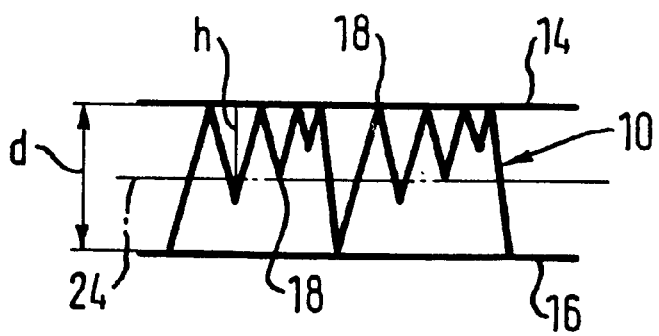
FIG. 2 shows a section through a gas bag according to the invention, which is folded according to a second kind.
Figure 3:
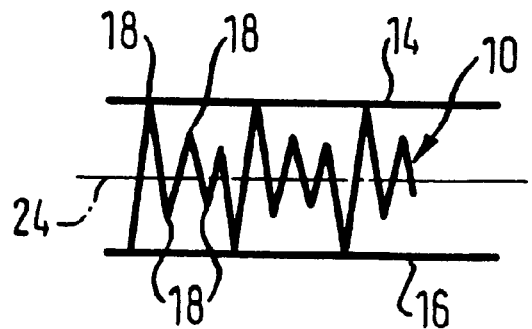
FIG. 3 shows a section through a gas bag according to the invention, which is folded according to a third kind.

FIGS. 1 to 3 show folded gas bags according to the invention in various possible kinds of folding. In FIG. 1, the gas bag 10 is folded such that viewed from a fold edge region 14, every other fold does not extend over the entire height d but only over half the height d up to an (imaginary) center line 24. In the case of a gas bag having this folding, the majority of the gas bag material lies on the side of the first fold edge region 14 rather than on the side of the second fold edge region 16, so that the center of gravity of the gas bag package is shifted towards the first fold edge region 14.

The gas bag 10 shown in FIG. 2 shows the same principle as regards its folding, in this case a recurring sequence of four folds being formed—again viewed from the first fold edge region 14—whose fold edges 18 on one side always lie on the first fold edge region 14 and—viewed from the other fold edge region 16—move constantly away therefrom, so that a sequence of folds with constantly decreasing fold height h results. With this folding the fold edges 18, facing the second fold edge region 16, of two successive folds each are staggered, so that the voluminous fold edges 18 are not directly superimposed to save packing volume. With this folding the center of gravity of the gas bag package is also shifted towards the first fold edge region 14.

FIG. 3 shows a folded gas bag 10 whose center of gravity lies on the center line 24, in which all fold edges 18 are staggered along the respective fold edge regions 14, 16.

Figure 5:
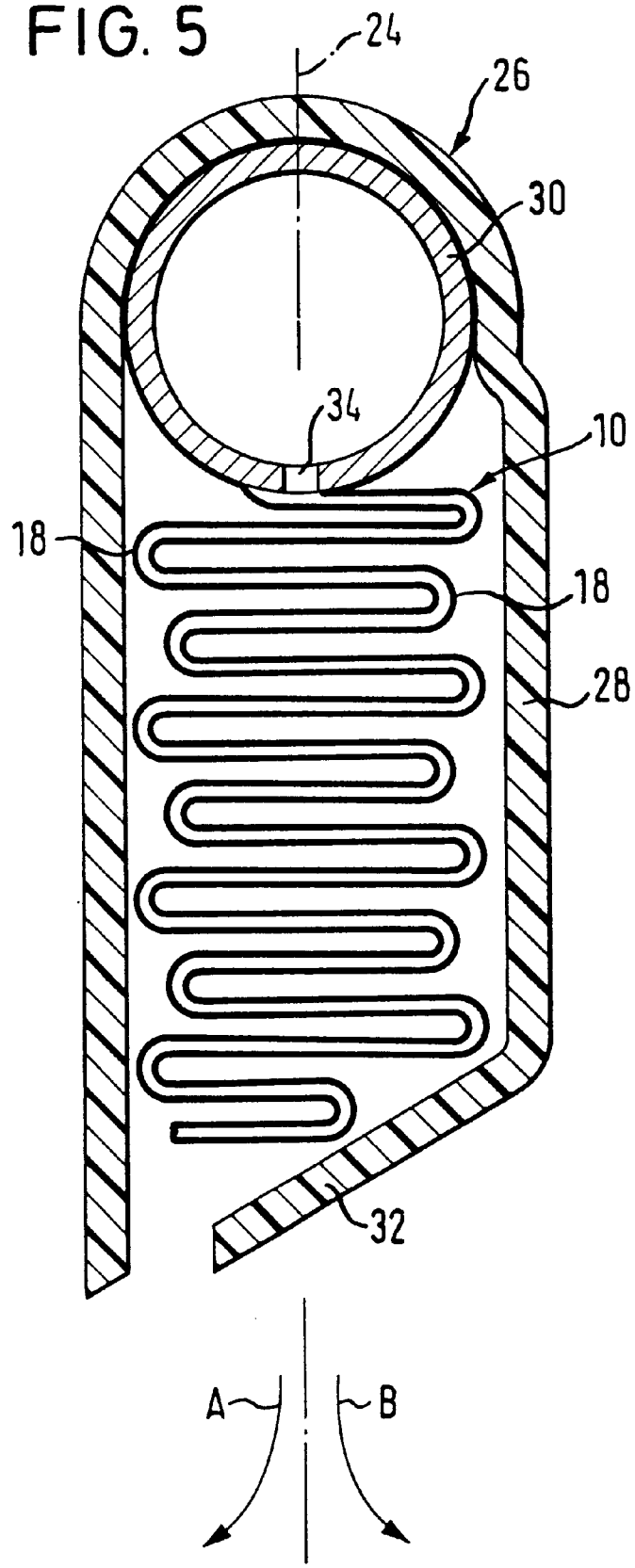
FIG. 5 shows a section through a gas bag module with a folded gas bag according to the invention.

In FIG. 5, a folded gas bag 10 is shown in a gas bag module 26 which has a housing 28. A gas lance 30 is inserted in the gas bag 10, through which lance gas flows into the gas bag via outlet openings 34 when the gas bag is activated to inflate the same.

The gas lance 30 is arranged at the top end of the housing 28. At the lower end, the housing 28 has a flap 32 through which the gas bag escapes when it is inflated. In FIG. 5, 24 denotes the imaginary center line known from FIGS. 1 to 4 already.

The folded gas bag 10 shown in FIG. 5 has a folding where the fold edges 18 are staggered on equal fold edge regions each. Since in this way the volume of the folded gas bag package can be reduced, the length of the housing can also be reduced. Because of its symmetric center-of-gravity position the gas bag 10 shown unfolds along the center line 24 when inflated.

If a gas bag having a folding according to FIG. 1 or FIG. 2 is used, the exit direction of the gas bag will differ from the center line 24 because the center of gravity is moved out of the center line 24 and the gas bag unfolds in a direction differing from the center line 24, in FIG. 5 shown by arrows A and B.

Another possibility to use the different folding methods shown consists in placing the folds which are closest to the gas lance 30 such that they fully or partially cover the outlet openings 34. In this way the unfolding behavior of the gas bag can be influenced.

Gas bags with foldings where the fold height is adapted to special housing shapes whose cross-sections differ from a rectangular cross-section so as to be better adapted to the installation space are also conceivable.

What is claimed is:

1. A folded gas bag for a vehicle occupant restraint system, said folded gas bag comprising two superimposed walls of said gas bag laid in folds, said folded gas bag being delimited by imaginary first and second fold edge regions, said first and second fold edge regions of said folds extending in a straight line and parallel to one another, said folds having fold heights measured from one of said fold edge regions and at least two differing fold heights being provided, a sequence of heights of said folds being chosen such that a center of gravity of said folded gas bag lies adjacent to an imaginary center line of said folded gas bag, said folded gas bag having an exit direction when said gas bag is inflated and said exit direction being influenced by said folded gas bag.

2. A folded gas bag for a vehicle occupant restraint system, said folded gas bag comprising two superimposed walls of said gas bag laid in folds, said folded gas bag being delimited by imaginary first and second fold edge regions, said first and second fold edge regions of said folds extending in a straight line and parallel to one another, said folds having fold heights measured from one of said fold edge regions and at least two differing fold heights being provided, said heights of successive folds corresponding to a repeating sequence of fold heights with at least two different fold heights.

3. The folded gas bag according to claim 2, wherein said sequence consists of a sequence of two folds, the second fold in the sequence having a height which is less than of a height of the first fold in the sequence.

4. The folded gas bag according to claim 2, wherein said sequence consists of a sequence of several folds having continuously decreasing fold heights.

* * * * *